United States Patent [19]
Winkler et al.

[11] 3,938,170
[45] Feb. 10, 1976

[54] STILL CAMERA WITH EXPANSIBLE HOUSING

[75] Inventors: Alfred Winkler, Munich; Dieter Engelsmann, Unterhaching; Rolf Schröder, Baldham, all of Germany

[73] Assignee: AGFA-Gevaert, AG, Leverkusen, Germany

[22] Filed: July 23, 1974

[21] Appl. No.: 491,144

[30] Foreign Application Priority Data
July 31, 1973 Germany............................ 2338794

[52] U.S. Cl. .................. 354/288; 354/187; 354/354
[51] Int. Cl.² ......................................... G03B 17/02
[58] Field of Search ........... 354/288, 202, 204, 187, 354/191, 354

[56] References Cited
UNITED STATES PATENTS

| | | | |
|---|---|---|---|
| 2,169,548 | 8/1939 | Zapp | 354/172 |
| 2,390,932 | 12/1945 | Fitz | 354/76 |
| 2,495,223 | 1/1950 | Bodlander | 354/288 |
| 3,256,793 | 6/1966 | Denk et al. | 354/288 |
| 3,680,455 | 8/1972 | Meinunger | 354/187 |
| 3,685,414 | 8/1972 | Good | 354/204 |
| 3,750,549 | 8/1973 | Waaske | 354/354 X |

*Primary Examiner*—Richard L. Moses
*Attorney, Agent, or Firm*—Michael J. Striker

[57] ABSTRACT

A flat still camera wherein a hollow section of the housing is reciprocable relative to the main section to thereby actuate the shutter and/or the film transporting mechanism. When the hollow section is moved to an extended position in which it exposes the lens and the view finder, the two sections define a slot into which a careless user is likely to introduce a finger, an eyelash or an eyelid while holding the camera in front of his eye and while moving the two sections with respect to each other. The rear end of the slot is closed by a portion of a door which is pivotably mounted on the main section and can be opened to afford access to the film chamber. Alternatively, the slot can be overlapped by a panel which is rigid with the main section or with the hollow section of the housing.

9 Claims, 3 Drawing Figures

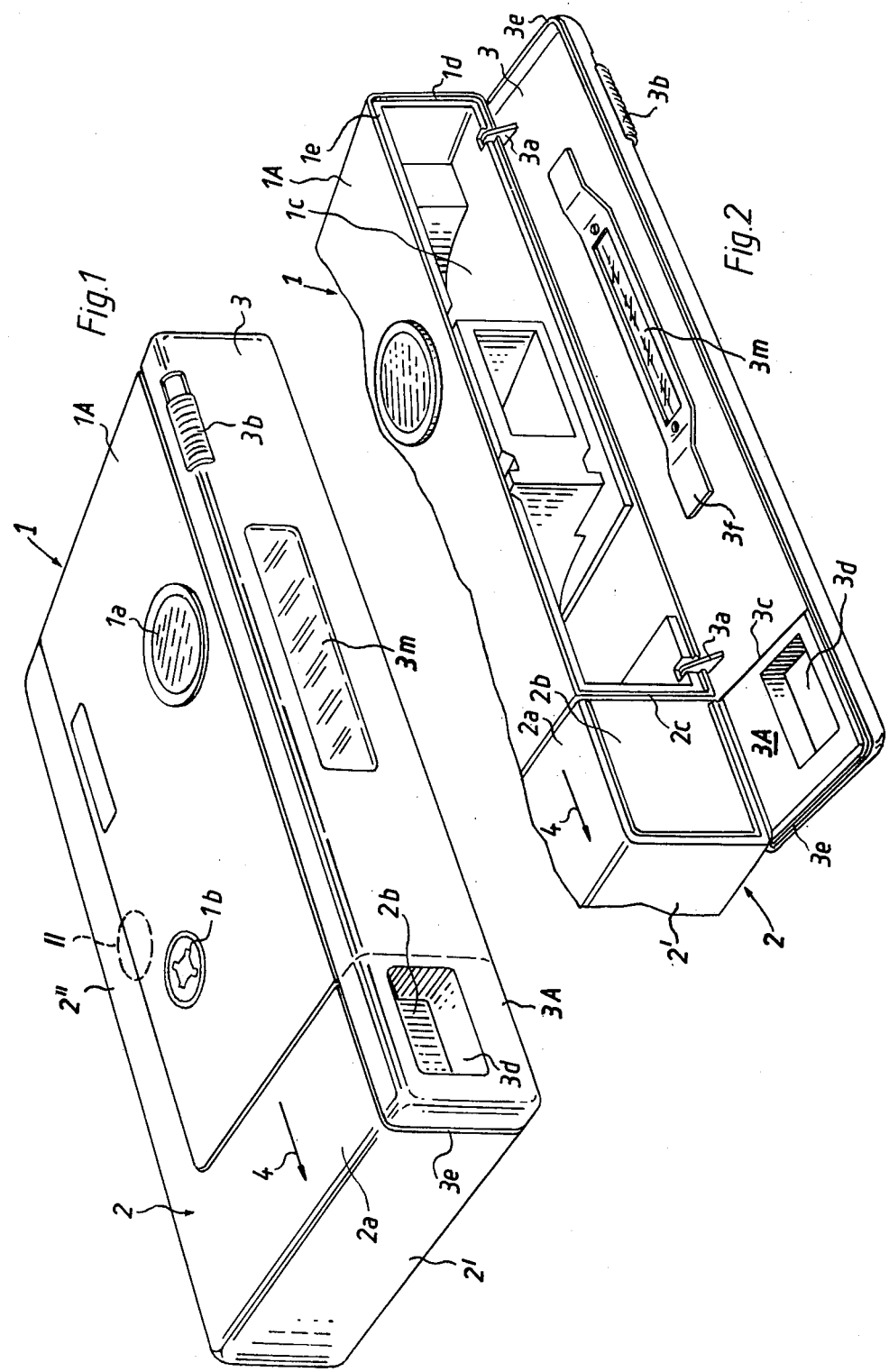

STILL CAMERA WITH EXPANSIBLE HOUSING

CROSS-REFERENCE TO RELATED APPLICATION

The photographic apparatus of the present invention constitutes an improvement over and a further development of photographic apparatus which are disclosed in the commonly owned copending application Ser. No. 344,366 filed Mar. 23, 1973 now U.S. Pat. No. 3,864,705 by Alfred Winkler for "Photographic apparatus with expansible housing", now U.S. Pat. No. 3,864,705 granted Feb. 4, 1975.

BACKGROUND OF THE INVENTION

The present invention relates to photographic apparatus in general, especially to still cameras, and more particularly to improvements in photographic apparatus of the type wherein the housing or body consists of two sections which are reciprocable with respect to each other to thereby increase or reduce the dimensions of the housing.

The copending application Ser. No. 344,366 of Winkler now U.S. Pat. No. 3,864,705 discloses a still camera wherein a main section of the housing supports a hollow second section which is reciprocable with respect to the main section to thereby cock the shutter and/or to actuate the film transporting mechanism. In a first end position, the second section overlaps and conceals the view finder, the picture taking lens and (if desired) one or more additional camera components. In a second end position, the second section exposes the lens and the view finder so that the camera is ready for the making of an exposure. When the second section assumes its second end position, one of its walls defines with a wall of the first section a slot or gap whose width decreases during movement of the second section to its first position. A clumsy or careless user is likely to insert into the slot a finger, an eyelid or one or more eyelashes while holding the camera in front of his eye and while moving the second section relative to the first section or vice versa.

SUMMARY OF THE INVENTION

An object of the invention is to provide a photographic apparatus with an expansible and contractible housing wherein the sections of the housing are constructed and assembled in such a way that the user is less likely or unable to introduce a finger, an eyelash or an eyelid into the slot which develops when the two sections are moved to positions in which the length of the housing is increased.

Another object of the invention is to provide the camera with a novel and improved door which can be moved to and from an open position in which it affords access to film in the camera body and which door also serves to reduce the likelihood of injury to a clumsy or careless user due to formation of the aforementioned slot between the camera body sections.

A further object of the invention is to provide a still camera whose housing is expansible and contractible for the purpose of transporting the film, actuating the shutter and/or indexing a multiple flash lamp holder, and wherein the rear part of the housing is constructed and configurated in such a way that the sections of the housing can be safely moved relative to each other while the camera is held in front of the eye.

The invention is embodied in a photographic apparatus, particularly in a still camera, which comprises a housing or body including a first section and a second section. The second section is supported by and is movable (preferably reciprocable) relative to the first section between first and second positions in which one of the sections respectively conceals and exposes a portion of the other section (e.g., the second section can conceal the picture taking lens and the view finder in the first position of the second section). The first and second sections respectively have first and second walls which are spaced apart in at least one position of the second section (normally in the second position of the second section) so that the walls define at least one slot. The camera further comprises a barrier or gate which is supported by at least one of the sections and overlies at least a portion of the slot in the one position of the second section. Such barrier may constitute a portion of a door which is provided at the rear side of the first section and is pivotable or otherwise movable between open and closed positions to respectively afford and prevent access to film in a chamber of the main section. The length of the door, as considered in the direction of movement of the second section, may equal the combined length of the two sections in the first position of the second section, and the door preferably overlaps the entire rear side of the first section and the entire rear side of the second section in the first position of the second section.

The two walls which flank the slot preferably constitute a composite top or bottom wall of the housing and the slot or slots are located nearer to the one end than to the other end of the housing, as considered in the direction of reciprocatory movement of the second section with respect to the first section.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a still camera which embodies the invention, the second section being held in its first position in which the lens and the view finder in the first section of the housing are fully concealed;

FIG. 2 shows a portion of the structure of FIG. 1 but with the door on the main section in an open position.

DESCRIPTION OF THE PREFERRED EMBODIMENTS

Figure 3:
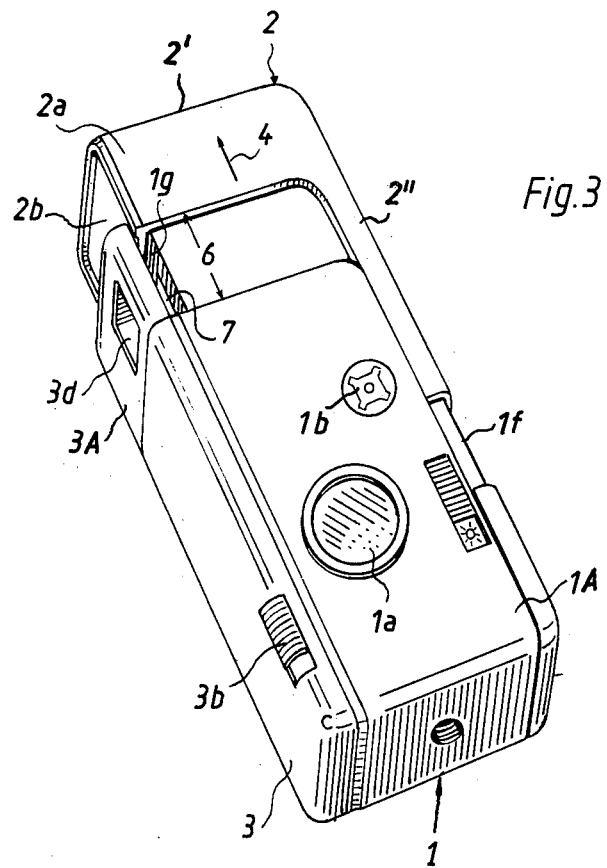
FIG. 3 is a smaller-scale perspective view of the camera with the second section of the housing shown in a second end position.

The still camera which is shown in FIGS. 1 to 3 comprises a housing or body including a substantially prismatic or brick-shaped first or main section 1 and a hollow second section 2. The first section 1 contains or carries all essential components of the camera, including an objective lens 11 which is mounted in a front wall 1f of the section 1, a view finder 7, a release including a deformable membrane 1a, and an indexible socket 1b for multiple flash lamp holders of the type known as Flashcubes or Magicubes (both trademarks). The socket 1b can be used in addition to or as a substitute for an accessory shoe (not shown) for the foot of an electronic flash unit. The section 1 defines a chamber 1c for a cassette containing a supply of roll film and backing paper. Still further, the section contains a shutter (not shown) and a film transporting mechanism which advances the film by the length of a frame whenever the second section is moved relative to the first section 1, either from the position shown in FIG. 1 to the position shown in FIG. 3 or vice versa. Such movement of the section 2 relative to the section 1 (or vice versa) preferably also results in actuation (e.g., cocking) of the shutter. The manner in which the movements of section 2 in or counter to the direction indicated by an arrow 4 can result in actuation of the film transporting mechanism and/or in actuation of the shutter is disclosed in the copending application Ser. No. 344,366 of Winkler now U.S. Pat. No. 3,864,705. When the section 2 is moved to the (first) end position shown in FIG. 1, it overlies and conceals certain components in the section 1, preferably the lens 11 and the view finder 7. The lens 11 and the view finder 7 are exposed when the section 2 is moved to the second end position shown in FIG. 3.

That portion of the second section 2 which conceals the view finder in the end position of FIG. 1 is shown at 2' and that portion of the section 2 which can conceal the lens 11 is shown at 2''. The external surfaces of the major portion of the section 2 are preferably flush with the adjacent external surfaces of the section 1 when the section 2 assumes the position of FIG. 1, i.e., the section 2 complements the section 1 so that the two sections form a relatively flat brick-shaped housing or body which can be stored in a small carrying case or inserted into a pocket.

The rear end face 1d of the section 1 has a recess 1e which normally receives a complementary projection or rib 3e provided on a door or cover 3 which is connected to the section 1 by two hinges 3a. The projection 3e then forms with the section 1 a labyrinth seal which prevents penetration of light into the chamber 1c. A locking device 3b on the door 3 can be actuated by the user to allow for pivoting of the door 3 from the closed position of FIG. 1 or 3 to the open position of FIG. 2 whereby the chamber 1c is accessible for insertion or removal of a cassette. The inner side of the cover 3 carries a pressure plate 3f which urges the cassette into the chamber 1a. The pressure plate 3f has a window 3m which allows for observation of numerals on backing paper for the film in a cassette; such numerals indicate the number of exposed or unexposed film frames and can be observed from without when the door 3 is held in the closed position of FIG. 1 or 3. The length of the door 3, as considered in the direction of reciprocatory movement of the section 2 relative to the section 1 or vice versa, equals the length of the housing in the first end position of the section 2, i.e., when the section assumes the position shown in FIG. 1 or 2.

The rear end face 1d of the section 1 is preferably flush with the outer side of a plate-like wall 2b which forms part of the section 2 and is movable in front of the left-hand portion of the door 3, as viewed in FIG. 1 or 2. When the section 2 assumes the position of FIG. 1 or 2, the wall 2b is located in front of an opening 3d in the door 3; this opening enables the user to look through the view finder 7 when the section 2 assumes the position shown in FIG. 3. A further opening (not shown) is provided in the portion 2'' of the section 2 to register with the opening 3d and view finder 7 when the section 2 is held in the position shown in FIG. 3. Since the section 2 then also exposes the lens 11, the camera is ready to make an exposure.

The inner side of the left-hand portion 3A of the door 3 may be provided with a shallow recess 3c which communicates with the opening 3d and can receive the wall 2b when the section 2 is held in the position of FIG. 1 if the rear side of the wall 2b extends rearwardly beyond the rear end face 1d of the main section 1. The recess 3c enables the section 2 to move between the positions of FIGS. 1 and 3 while the device 3b holds the door 3 in closed position. The device 3b can be actuated to permit a pivotal movement of the door 3 to the open position of FIG. 2 while the section 2 dwells in the position of FIG. 1 or FIG. 3. When a fresh cassette is inserted into the chamber 1c and the cover 3 is pivoted back to the closed position of FIG. 1, the user of the camera moves the section 2 in and counter to the direction indicated by arrow 4 to thereby advance the film by the length of a frame. Such operation is repeated until the numeral "1" on the backing paper appears in front of the window 3m; this indicates that the foremost unexposed film frame is located behind the lens 11. When an exposure has been completed, the user moves the section 2 counter and thereupon in the direction of arrow 4 to cock the shutter and to move the next film frame into register with the lens 11. The exposures are made in response to minute deformation of the membrane 1a. As disclosed in the copending application Ser. No. 344,366 of Winkler now U.S. Pat. No. 3,864,705, the camera may include suitable biasing means which urges the section 2 to the position of FIG. 3 and with suitable retaining or arresting means which can releasably hold the section 2 in the position of FIG. 1 whereby the biasing means is stressed and automatically returns the section 2 to the position of FIG. 3 as soon as the arresting means is actuated to allow for such movement of the section 2. Thus, in order to make a series of exposures, the user merely pushes the section 2 to the position of FIG. 1 against the opposition of the biasing means and thereupon relaxes the pressure upon the section 2 so that the biasing means can dissipate energy and extends the housing to thereby enable the user to look through the view finder 7 and observe the subject or scene to be photographed. The rear optical element of the view finder 7 is mounted in a wall 1g of the section 1 (see FIG. 3). The wall 1g has an opening in register with the opening 3d in the door 3 and with the view finder 7 in the section 1. The projection 3e on the door 3 has a portion which partially surrounds the opening 3d and engages the wall 2b to prevent entry of light into the chamber 1c in each position of the section 2. The edge portion 2c of the wall 2b engages the leftmost portion of the rib 3e as viewed in FIG. 2, when the section 2 assumes the position shown in FIG. 3. This insures that no light can penetrate into the recess 3c and thence into the chamber 1c.

The wall 2b exhibits the important advantage that it prevents penetration of foreign matter into the view finder 7 when the section 2 is held in the position of FIG. 1 or 2. The portion 3A of the door 3 constitutes a barrier which protects a user from injury by extending in front of a slot 6 (FIG. 3), which is defined by the walls 1A, 2a of the sections 1 and 2 when the section 2 has been moved in the direction indicated by the arrow 4. The width of this slot is reduced to zero when the section 2 is thereupon moved to the position shown in FIGS. 1 or 2. The barrier 3A of the door 3 can prevent the eyelid or the eyelashes of a user from entering the slot 6 from behind if the user looks through the opening 3d while the section 2 is being moved relative to the section 1 or vice versa. An advantage of the barrier 3A is that it overlies the rear end of the slot 6 whenever the slot develops as a result of movement of the section 2 relative to the section 1 or vice versa and that this barrier constitutes a portion of a component (door 3) which is needed in the camera irrespective of the fact that the sections 1, 2 form a slot.

A second slot similar to the slot 6 is formed at the underside of the camera when the section 2 is moved to the position shown in FIG. 3. This second slot is flanked by two walls (not specifically shown but corresponding to the walls 1A and 2a) which together constitute a composite bottom wall of the housing. The lower edge portion of the barrier 3A overlies (i.e., is located in front of) the second slot.

It is clear that the length of the door 3, as considered in the direction indicated by the arrow 4, can be reduced, as long as the barrier is located behind the major part of or behind the entire slot 6 in extended position of the housing 1, 2. Moreover, the door 3 can be removably mounted on the section 1, i.e., the hinges 3a can be omitted and the door can be completely separated from the section 1 when the user wishes to remove a cassette from the chamber 1c or to insert a fresh cassette. Still further, the door 3 can be designed in such a way that it also overlies a portion of the upper side and/or the underside of the section 1 and/or section 2. If the door overlies portions of the upper sides of the sections 1, 2, it further reduces the likelihood of injury due to the presence of the slot 6. It is also contemplated to provide in the section 1 a second chamber for one or more batteries which supply current to an electrical exposure control and to provide a gate which normally closes the rear end of the second chamber whereby such gate performs the function of the portion 3A of the door 3 by preventing an eyelash or eyelid from entering the slot 6. The gate may be mounted for reciprocatory movement between a first position in which it exposes the second chamber and a second position in which the open rear end of the second chamber is overlapped. It is further possible to provide on the section 1 or 2 a rigid panel or the like which performs the function of a barrier and prevents the penetration of an eyelash or eyelid into the slot 6 from above.

It is also within the scope of the invention to use several barriers which reduce the likelihood of injury to the user due to the formation of slot 6 while the section 2 moves in the direction indicated by the arrow 4. Thus, the leftmost portion 3A of the door 3 may constitute a barrier at the rear end of the slot 6 and a further barrier (e.g., a panel or mask on the section 1 or 2) may overlie the slot 6 from above. Such construction further reduces the likelihood of injury to the operator of the camera.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, particularly in a still camera, a combination comprising a housing having a rear side and including a first section and a second section which is supported by and is reciprocable relative to said first section between first and second positions in which one of said sections respectively conceals and exposes a portion of the other of said sections, said first and second sections respectively having first and second walls which are spaced apart in at least one of said positions of said second section whereby said walls define at least one slot; and a barrier located at the rear side of said housing, supported by one of said sections and overlying at least a portion of said slot in said one position of said second section.

2. A combination as defined in claim 1, wherein one of said sections has a door which is located at said rear side of said housing and said door includes a portion which constitutes said barrier.

3. A combination as defined in claim 1, wherein said walls of said sections together form a composite top wall of said housing and the width of said slot is greatest in said second position of said second section.

4. A combination as defined in claim 1, wherein said housing is elongated and said slot is nearer to the one than to the other end of said elongated housing.

5. In a photographic apparatus, particularly in a still camera, a combination comprising a housing including a first section and a second section which is supported by and is reciprocable relative to said first section between first and second positions in which one of said sections respectively conceals and exposes a portion of the other of said sections, said first and second sections respectively having first and second walls which are spaced apart in at least one of said positions of said second section whereby said walls define at least one slot and said first section further having a front wall and a rear end face facing away from said front wall; a picture taking lens mounted in said front wall; and a barrier supported by one of said sections and overlying at least a portion of said slot in said one position of said second section, said barrier having a surface which is parallel to or flush with said rear end face of said first section.

6. In a photographic apparatus, particularly in a still camera, a combination comprising a housing including a first section and a second section which is supported by and is reciprocable relative to said first section between first and second positions in which one of said sections respectively conceals and exposes a portion of the other of said sections, said first and second sections respectively having first and second walls which are spaced apart in at least one of said positions of said second section whereby said walls define at least one slot, one of said sections having a door having a length which equals the combined length of said sections, as considered in the direction of reciprocatory movement of said second section, when said second section assumes said first position; and a barrier forming part of said door, supported by one of said sections and overlying at least a portion of said slot in said one position of said second section.

7. A combination as defined in claim 6, wherein each of said sections has a rear side and said door completely overlies said rear sides in said first position of said second section.

8. In a photographic apparatus, particularly in a still camera, a combination comprising a housing including a first section and a second section which is supported by and is reciprocable relative to said first section between first and second positions in which said second section respectively conceals and exposes a portion of said first section, said first and second sections respectively having first and second walls which are spaced apart in at least one of said positions of said second section whereby said walls define at least one slot, a view finder provided in said first section, said first section further having a third wall provided with an opening which registers with said view finder and is exposed in said second position of said second section; and a barrier supported by one of said sections and overlying at least a portion of said slot in said one position of said second section.

9. A combination as defined in claim 8, wherein said first section comprises a cover a portion of which constitutes said barrier and has a second opening in register with said opening of said third wall, said second section having a fourth wall which extends between said openings in said first position of said second section.

* * * * *